Figure 1:
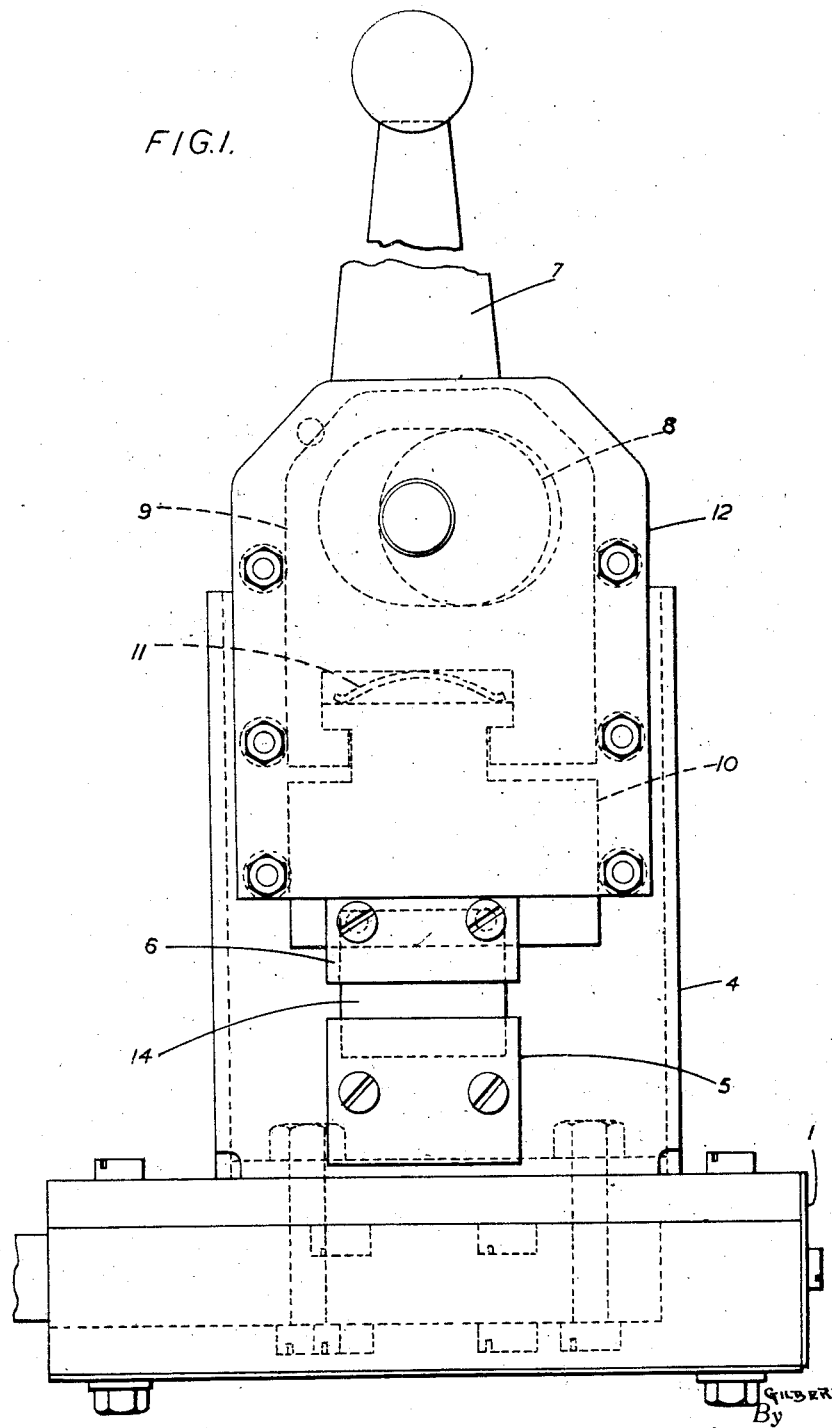

Patented July 1, 1947

2,423,096

UNITED STATES PATENT OFFICE 2,423,096

ELECTRIC WELDING APPARATUS

Gilbert Gilliver, London, England, assignor to Standard Telephones and Cables Limited, London, England, a British company Application March 26, 1945, Serial No. 584,799
In Great Britain April 21, 1944

6 Claims. (Cl. 219—4)

This invention relates to electric welding apparatus for joining wires or the like, and is particularly applicable for use with the condenser discharge welding apparatus described in the specification of my co-pending U. S. application, Serial No. 554,368, filed September 16, 1944.

The invention provides a tool for the electric fuse welding of conductors comprising means for clamping the conductors with their ends in a fixed position with respect to a welding electrode, a shutter normally interposed between the conductors and the electrode, and means for advancing the electrode into contact with the said ends, the last-mentioned means being adapted also to cause the withdrawal of the shutter out of the path of the electrode.

Stated in another way, the invention provides a tool for the electric fuse welding of conductors comprising clamping means adapted when operated to clamp the conductors with their ends opposite a welding electrode, a gauging shutter interposed between the conductors and the electrode and adapted to locate the said ends at a specified distance from the said electrode, means for advancing the electrode into contact with the said ends, the last mentioned means being also adapted first to release the shutter to permit it to be withdrawn from the path of the electrode by means provided therefor, and means adapted on the release of the clamping means to restore the shutter to the interposed position.

More specifically the invention also provides a welding tool designed for attachment to the welding equipment and comprises lever operated jaws for clamping the wires to be welded, a carbon welding electrode mounted on a spring controlled plunger and adapted to be moved into contact with the ends of the wires, a shutter device associated with the jaws and normally interposed between the wires and the electrode and means associated with the plunger operated electrode for releasing the shutter and allowing the electrode to make contact with the wires in a predetermined position.

More particularly when designed for use with the condenser discharge apparatus above referred to the welding tool comprises an operating lever arranged to open and close two copper jaws which clamp the wires to be welded, and a carbon electrode holder fitted with a restoring spring and contacts which charge a condenser in their unoperated position, and discharge the condenser through the carbon electrode, the wires to be welded, and the copper jaws, when the push button is pressed forward to bring the electrode into contact with the wires to be fused.

The lever also operates a movable shutter which is locked in position behind the copper vice jaws when the lever is in the vertical position, which shutter acts as a gauging stop for the wires inserted in the aperture and ensures that they are located in the correct position for the carbon electrode to fuse weld the wires and form a satisfactory bead thereon.

The advance of the push button first releases the shutter stop by means of an insulating stud which releases the catch holding the shutter and the shutter is withdrawn by a spring out of the way of the advancing carbon electrode.

After welding, the lever is restored, the wires removed and this operation restores the shutter to its gauging position.

Figure 2:
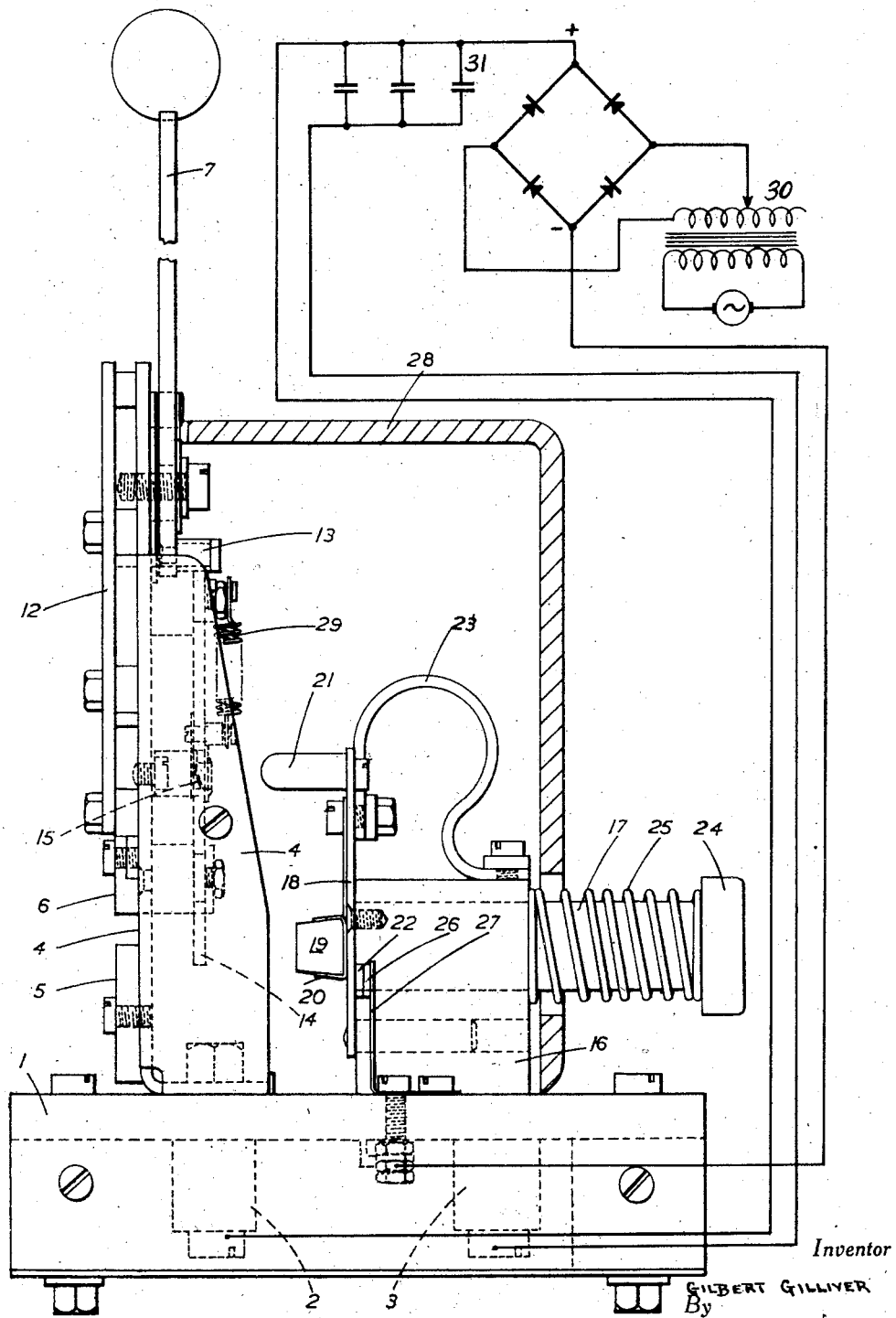

The invention will be explained with reference to the accompanying drawings of which Figs. 1 and 2 show respectively front and side views of an example of a welding tool according to the invention adapted for use with the condenser discharge fuse welding equipment described in the above mentioned specification.

The tool comprises a built-up box of Bakelite panels and side pieces 1 carrying two copper busbars 2 and 3 on the underside of the top panel which have circular ends provided to enter circular sockets on the fuse welding equipment. One of these bus-bars 2 is connected by screws and nuts to a metal bracket 4 which carries a fixed metal vice jaw 5, a movable metal vice jaw 6, an operating handle 7, a cam 8 controlling the movement of a slide 9 and an extension 10 which carries the moving vice jaw 6, and which is controlled by the spring 11. The cam 8, the slide 9 and the extension 10 are mounted between the bracket 4 and a front plate 12 in such a manner that when the handle 7 is in the vertical position, the operating vice jaws 5 and 6 have a suitable opening for the insertion of the wires to be welded.

The handle 7 is pivoted on the back of the bracket 4 and carries a roller 13 which when the handle 7 is restored after welding to the vertical position shown, depresses the gauging shutter 14 so that it lies behind the welding aperture and is retained in position by the catch 15.

The wires are inserted in the aperture until they make contact with the shutter 14 and the handle 7 is then depressed to a 90° position; this clamps the wires firmly between the vice jaws 5 and 6.

The other bus-bar 3 is connected to a copper block 16, which is drilled to take the push button stem or plunger 17. A plate 18 mounted on the front of the push button stem 17 carries the carbon electrode 19 mounted in a spring holder 20, a pin of insulating material 21, and a contact 22.

A piece of copper braid 23 connected between the copper block 16 and the contact plate 18, ensures a good electrical connection with the electrode 19.

The push button stem 17 has a head 24 under which is a spiral spring 25 which restores it to its non-operated position. The contact 22 carried on the plate 18 engages a contact 26 mounted on a spring 27 carried on top of the box 1 and is intended to be connected flexibly to a loose plug (not shown) which is inserted in a socket on the welding equipment when the tool is fixed for use.

A cover 28 completely encloses the inner working parts of the tool, prevents hot fragments from flying out of the tool and shields the welding flash from the operator's eyes.

The bus-bars 2 and 3 are intended to be connected to the two terminals of a source of welding current which may, for example, be a charged welding condenser such as is described in the above quoted specification. The contact 26 is in that case connected to one terminal of the charging source for the welding condenser, and therefore maintains the condenser charged, since the contact 22 which it engages in the unoperated position of the plunger 13 is connected through the block 16 to the bus-bar 3. As soon as the plunger 17 is operated, the contacts 22 and 26 are opened, thus disconnecting the condenser from the charging source, so that it is ready to fuse-weld the wires to be joined. The details of this arrangement can be obtained from the specification mentioned. As here shown, the condenser discharge and charging circuit arrangement includes a transformer 30 having its primary energized from a suitable source and its secondary connected by an adjustable tap to a rectifier bridge network having its positive terminal connected through the condensers 31 to the bus bar or terminal 3 to normally complete the charging circuit through the contacts 22 and 26, the latter of which is connected to the negative pole of the rectifier bridge. The terminal or bus bar 2 is likewise connected as shown to the positive terminal of the rectifier bridge for completion of the welding circuit from the condensers through the wires to be joined when the carbon electrode is advanced, the return circuit then being through the bus bar 3 to the negative terminal of the condenser.

The wires having been clamped as previously described, the push button head 24 is pressed, opening the contacts 22 and 26 above referred to. The insulating pin 21 depresses the catch 15 and releases the shutter 14 which is lifted by a spring 29.

On further advancing the press button head 24, the carbon electrode 19 makes contact with the wires and fuse welds them with a bead by discharging through them the welding condenser in the manner described in the above quoted specification.

On release, the push button head 24 is restored by the spring 25, and the contacts 22 and 26 engage again, thus recharging the condenser. The handle 7 is then restored to the vertical position, releasing the welded wires and restoring the shutter 14 to its gauging position ready for the next operation.

It will be understood that the invention is not limited to the precise details of construction described above, but is capable of various modifications. Also although reference has been made to the joining of wires it will be appreciated that this expression is intended to include the joining of wires or strips etc. to terminal tags or other devices.

What is claimed is:

1. A tool for the electric fuse welding of conductors comprising means for clamping the conductors with their ends in a fixed position with respect to a welding electrode, a shutter normally interposed between the conductors and the electrode, and independently actuated means for advancing the electrode into contact with the said ends, the last-mentioned means being adapted also to cause the withdrawal of the shutter out of the path of the electrode.

2. A tool for the electric fuse welding of conductors comprising clamping means adapted when operated to clamp the conductors with their ends opposite a welding electrode, a gauging shutter interposed between the conductors and the electrode and adapted to locate the said ends at a specified distance from the said electrode, independently actuated means for advancing the electrode into contact with the said ends, the last mentioned means being also adapted first to release the shutter to permit it to be withdrawn from the path of the electrode by means provided therefor, and means adapted on the release of the clamping means to restore the shutter to the interposed positions.

3. A tool for the electric fuse welding of conductors comprising lever operated jaws for clamping the conductors to be welded, a carbon welding electrode mounted on a spring-controlled plunger and adapted upon independent actuation to be moved into contact with the ends of the conductors, a shutter device associated with the jaws and normally interposed between the conductors and the electrode, and means associated with the plunger for releasing the shutter and allowing the electrode to make contact with the conductors in a predetermined position.

4. A tool for the electric fuse welding of conductors comprising a lever adapted on operation to close two copper jaws for clamping the conductors to be welded, a carbon electrode secured in a holder mounted on a spring-controlled push button device for advancing the electrode into contact with the ends of the conductors, a shutter device associated with the jaws and normally interposed between the conductors and the electrode, means associated with the push button device for causing the withdrawal of the shutter device from the path of the electrode, and circuit means connected with the push button device to charge a welding condenser in the unoperated position thereof, and for discharging the said condenser through the conductors, jaws, and electrode when the electrode makes contact with the conductors.

5. A tool according to claim 4 comprising a spring adapted to urge the shutter out of the path of the electrode, a catch adapted to hold the shutter in position against the action of the spring, and an insulating pin associated with the push button for operating the catch to release the shutter after the push button has advanced a short distance from its unoperated position.

6. A tool according to claim 4 wherein the charging means comprises a welding condenser, a charging source for the condenser, and a pair of contacts associated with the plunger for connecting the condenser to the charging source, the said contacts being closed in the unoperated position of the plunger, and the operation of the plunger being adapted to disconnect the condenser by opening the said contacts and subsequently to discharge the condenser through the electrode, conductors, and clamping means when the electrode makes contact with the said conductors, thereby fuse welding the said conductors together.

GILBERT GILLIVER.

REFERENCES CITED

The following references are of record in the file of this patent:

UNITED STATES PATENTS

| Number | Name | Date |
| --- | --- | --- |
| 1,897,606 | Cole et al. | Feb. 14, 1933 |
| 2,294,388 | Dawson | Sept. 1, 1942 |